(12) United States Patent
Dombek et al.

(10) Patent No.: US 11,313,244 B2
(45) Date of Patent: *Apr. 26, 2022

(54) PIVOT FOR A SLIDING BEARING

(71) Applicant: SAFRAN TRANSMISSION SYSTEMS, Colombes (FR)

(72) Inventors: Alexis Claude Michel Dombek, Moissy-Cramayel (FR); Julie Marie Renée Lemoine, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/646,832

(22) PCT Filed: Sep. 12, 2018

(86) PCT No.: PCT/FR2018/052233
§ 371 (c)(1),
(2) Date: Mar. 12, 2020

(87) PCT Pub. No.: WO2019/053371
PCT Pub. Date: Mar. 21, 2019

(65) Prior Publication Data
US 2020/0271008 A1 Aug. 27, 2020

(30) Foreign Application Priority Data
Sep. 12, 2017 (FR) .................................... 1758423

(51) Int. Cl.
*F01D 15/12* (2006.01)
*F01D 25/16* (2006.01)
*F16C 17/04* (2006.01)

(52) U.S. Cl.
CPC .......... *F01D 15/12* (2013.01); *F01D 25/168* (2013.01); *F16C 17/04* (2013.01); *F05D 2260/40311* (2013.01); *F16C 2360/23* (2013.01)

(58) Field of Classification Search
CPC ....................................................... F01D 15/12
See application file for complete search history.

(56) References Cited

U.S. PATENT DOCUMENTS 8,333,678 B2 * 12/2012 McCune ............... F01D 25/162
475/331
8,506,446 B2 * 8/2013 Minadeo ............... F16H 57/082
475/346

FOREIGN PATENT DOCUMENTS

EP  1 837 542 A2  9/2007
EP  2 270 361 A2  1/2011
(Continued)

OTHER PUBLICATIONS

International Patent Application No. PCT/FR2018/052233, International Search Report and Written Opinion dated Jan. 3, 2019, 18 pgs.

*Primary Examiner* — Juan G Flores
(74) *Attorney, Agent, or Firm* — Lathrop GPM LLP

(57) ABSTRACT

The invention relates to a pivot (58) for a sliding bearing of an epicyclic train, comprising an annular wall (50) defining an axial passage (51) and comprising a first (52*c*) and a second (54*c*) annular groove opening axially in opposite directions (L1, L2) and each defined by two coaxial inner (52*a*, 54*a*) and outer (52*b*, 54*b*) annular branches formed at the axial ends of the annular wall (50). According to the invention, the recesses (60) are made in at least one bottom wall (52*d*, 54*d*) of one of the annular grooves (52*c*, 54*c*).

17 Claims, 3 Drawing Sheets

(56) References Cited

FOREIGN PATENT DOCUMENTS

EP      2 607 695 A1    6/2013
EP      3 029 358 A1    6/2016

\* cited by examiner

PIVOT FOR A SLIDING BEARING

CROSS-REFERENCE TO RELATED APPLICATIONS

This application is a 35 U.S.C. § 371 filing of International Application No. PCT/FR2018/052233 filed Sep. 12, 2018, which claims the benefit of priority to French Patent Application No. 1758423 filed Sep. 12, 2017, each of which is incorporated herein by reference in its entirety.

FIELD OF THE INVENTION

The present invention concerns a pivot for a sliding bearing and more particularly a pivot intended to be integrated in an epicyclic gear train of a turbine engine such as a turbojet or turboprop engine.

BACKGROUND OF THE INVENTION

Classically an epicyclic gear train consists of planetary pinions meshing with an outer ring gear and a central pinion. The planetary pinions are carried by a planetary carrier and mounted freely rotatably on pivots. Such an epicyclic gear train can be used in particular for the power transmission from a drive shaft such as the shaft of a low-pressure compressor connected to the central pinion, to a blower wheel connected to the planetary carrier.

Each pivot is formed by an annular wall delimiting an axial passage and comprising a first and a second annular groove opening axially in opposite directions. Each groove is delimited by two coaxial inner and outer annular branches formed at the axial ends of the annular wall. The inner and outer branches of each groove provide flexibility at the axial ends of the pivot, thus limiting the deformation of the pivot and thus ensuring good radial alignment of the planetary pinion teeth with the centre pinion and outer ring gear. However, it can be seen that this type of pivot is not yet optimal since it contributes significantly to the total mass of the epicyclic gear train.

SUMMARY OF THE INVENTION

The present invention first concerns a pivot for a sliding bearing of an epicyclic gear train, comprising an annular wall defining an axial passage and comprising a first and a second annular groove opening axially in opposite directions and each defined by two coaxial inner and outer annular branches formed at the axial ends of the annular wall, characterized in that recesses are formed in at least one bottom wall of one of the annular grooves.

The recesses are made in a massive area of the pivot, thus reducing the mass of the pivot. In addition, this area has the advantage of being subject to few mechanical stresses during operation. These recesses can be made by drilling on an existing pivot in accordance with the prior technique, which is quick and easy to make.

The recesses are, for example, distributed around the axial passage. They may be regularly distributed around said axial passage.

According to another feature of the invention, the recesses are holes opening at a first end into the first annular groove and at a second, opposite end into the second annular groove.

The holes can be regularly distributed around the axial passage. They may also be uniformly distributed over a given angular sector around the axial passage, in which case the angular area devoid of holes such as the above-mentioned may then accommodate one or more lubricating oil passage conduit(s) extending from the axial passage up to an outer surface of the pivot.

The holes may be substantially straight and their axes may advantageously be inclined in relation to the axis of the axial passage, preferably at an angle between 0° and 30°. This last configuration makes it possible to reduce the mass while maintaining good mechanical rigidity at the pivot.

The invention also relates to an epicyclic gear train of an aircraft gas turbine engine, comprising an outer ring gear and planetary pinions meshing with the central pinion and with the outer ring gear and each mounted free to rotate on a planetary carrier, the planetary pinions each being rotatable about a planet axis via a pivot as described above.

Also, the invention relates to an aircraft gas turbine engine comprising a gear train, the central pinion of which surrounds and is rotationally integral with a compressor shaft of the turbine engine. More specifically, the outer ring can be attached to a casing or static annular shroud of the low-pressure compressor. In this configuration, the epicyclic gear train forms a reduction gear since the speed of rotation of the planetary carrier is lower than that of the centre pinion.

Of course, the invention is also applicable to epicyclic gear trains such as, for example, epicyclic gear trains in which the outer ring gear is also rotatable.

The invention is further applicable to an epicyclic gear train in which the planetary carrier is fixed and the outer ring gear is movable. This type of assembly is also known as planetary reduction gear.

The invention will be better understood and other details, characteristics and advantages of the invention will appear when reading the following description, which is given as a non-limiting example, with reference to the attached drawings.

DETAILED DESCRIPTION

Figure 1:
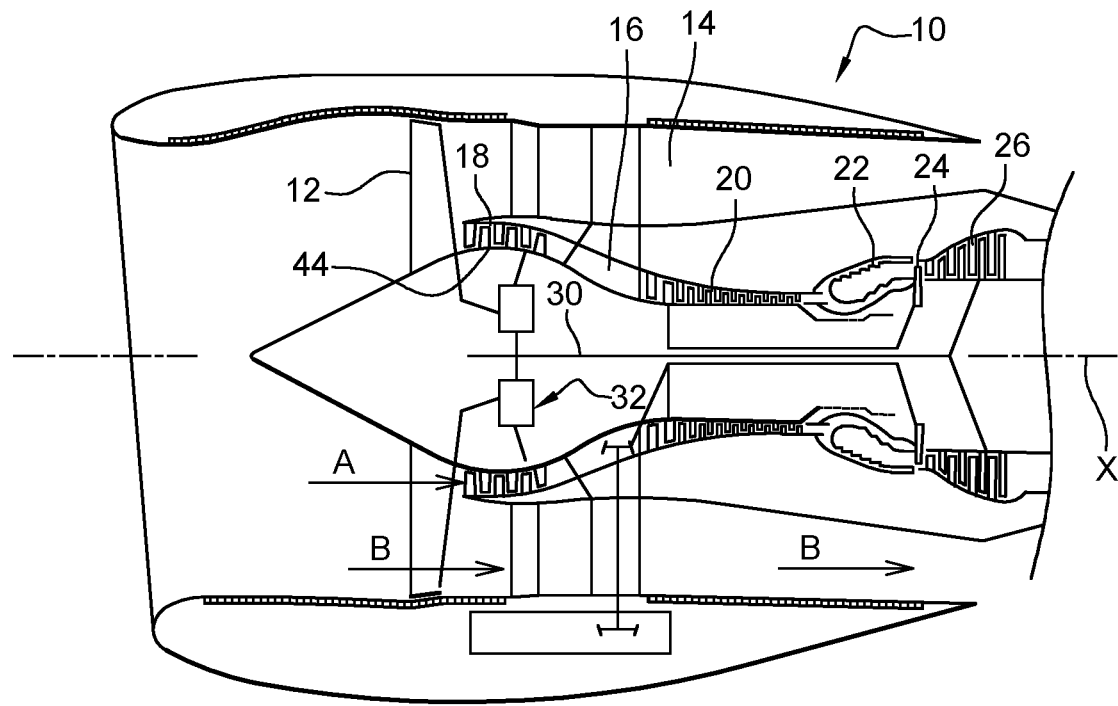
FIG. 1 is a schematic view, in perspective, of a turbine engine according to the known technique.
Figure 2:
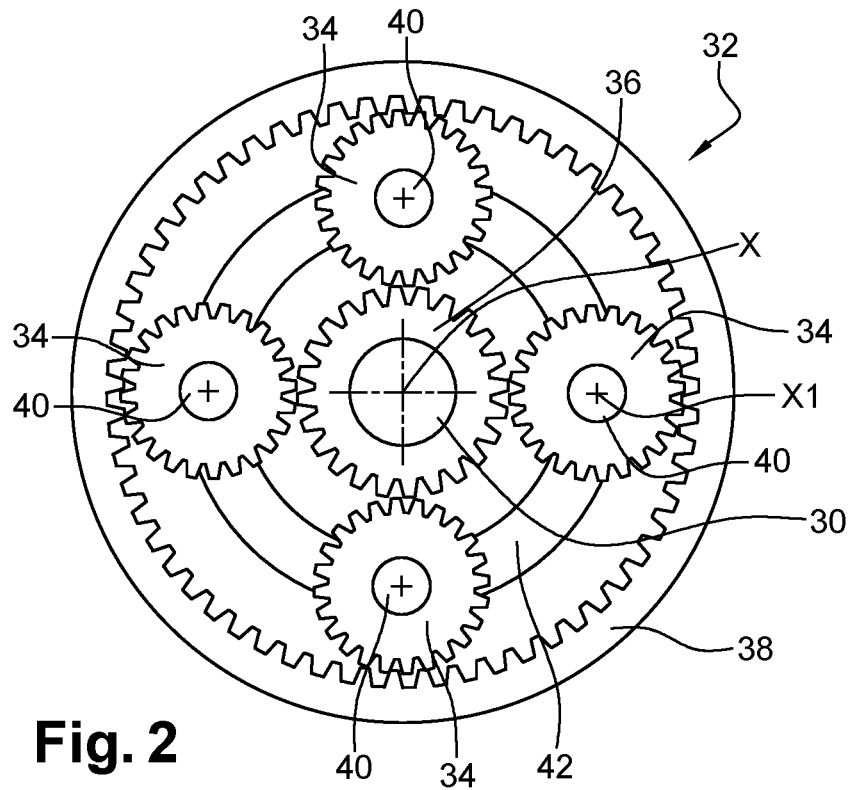
FIG. 2 is a cross-sectional schematic view of an epicyclic gear train intended to be used in a turbine engine of FIG. 1.

Reference is made first of all to FIG. 1, which shows a schematic view of a turbine engine 10, as known, comprising in an uppath-downpath direction, a fan wheel 12 whose rotation induces acceleration of air in an annular secondary air path 14 (air flow B) surrounding successively an annular primary air path 16 (air flow A) flowing into a low-pressure compressor 18, a high-pressure compressor 20, an annular combustion chamber 22, a high-pressure turbine 24 and a low-pressure turbine 26. Classically, the low-pressure turbine 26 rotates the rotor 30 of the low-pressure compressor, which is connected to the fan wheel 12. However, in order to limit the rotational speed of the fan wheel 12 in relation to the rotational speed of the rotor 30 of the low-pressure compressor 18, it is known to mount an epicyclic gear train 32 radially inside the low-pressure compressor 18, this epicyclic gear train 32 being referred to as a reduction gear due to its speed rotating reducing function.

Such a gear train 32 comprises planetary pinions 34 meshing with an inner sun gear 36 or central pinion and with an outer sun gear 38 or outer ring gear, the inner sun gear 36 and outer ring gear 38 being coaxial to the X axis of the turbine engine. Each satellite pinion 34 is mounted freely rotatable around a pivot 40 and the pivots 40 are integral with a planetary carrier 42. In an epicyclic gearbox, the central pinion 36 is rotationally rigidly connected to the shaft 30 of the low-pressure compressor 18 which forms an input of the gear train, the planetary carrier 42 rigidly connected to the fan wheel 12 forms an output for reducing the speed of the epicyclic gear train and the outer ring gear 38 is rigidly connected to a casing 44 of the turbine engine internally delimiting an annular zone in which the gear train is mounted.

The invention to be further described thus applies not only to a gear train 32 of the reduction gear type but also to a gear train in which the outer ring gear 38 is rotatably connected to a second fan wheel, the outer ring gear 38 and the planetary carrier being configured/sized to rotate in opposite directions.

Figure 3:
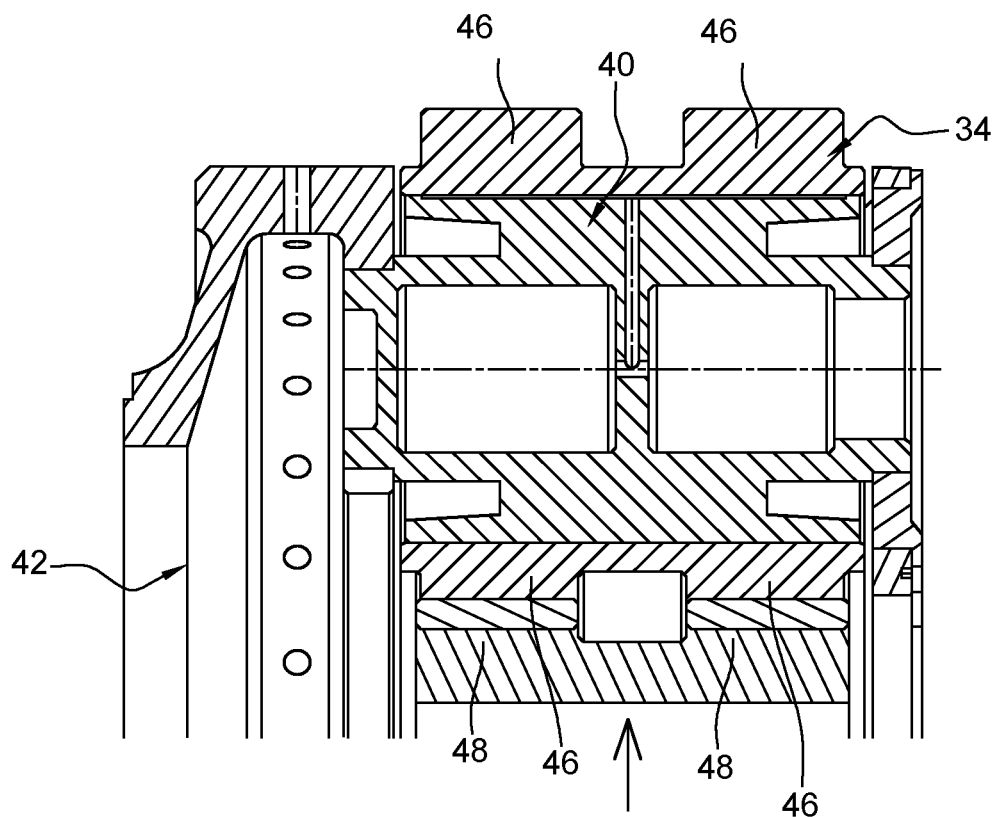
FIG. 3 is a cross-sectional schematic view of a satellite pinion and of the planetary carrier of FIG. 2.

FIG. 3 shows a sectional view of a pivot 40 around which a planetary pinion 34 is engaged to form a sliding bearing, the peripheral teeth 46 of the planetary pinion 34 being shown meshing with the peripheral teeth 48 of the central pinion 36 but not with the outer ring gear, which is not shown in this figure.

Figure 4:
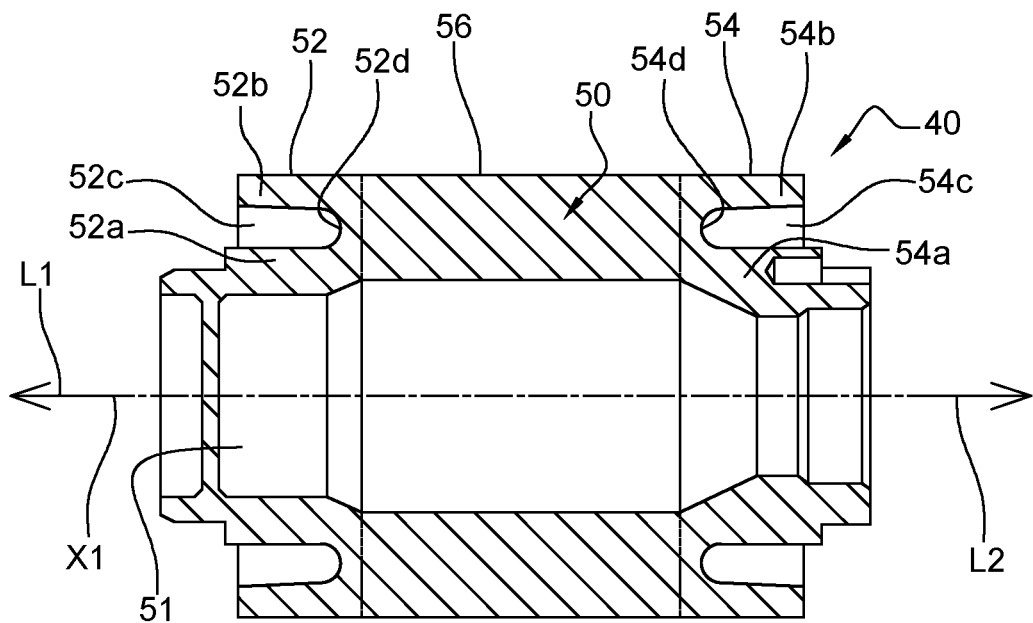
FIG. 4 is a cross-sectional schematic view of a pivot around which a satellite pinion rotates.

As is clearly visible in this figure and more specifically in FIG. 4, the pivot 40 comprises an annular wall 50 which delimits radially inwards an axial passage 51 extending along the axis X1 of the pivot. This annular wall 50 comprises a first annular part 52 and a second annular part 54 opposite to the first part 52. The first annular part 52 and the second annular part 54 are separated by an intermediate annular part 56 or spacer. The first annular part 52 comprises two coaxial radially inner annular branches 52a and outer annular branches 52b delimiting a first groove 52c or annular groove opening in a first direction L1 of the axial direction X1. In addition, the second annular part 54 comprises two coaxial radially inner annular branches 54a and outer annular branches 54b delimiting a second groove 54c or annular groove opening in a second direction L2 of the axial direction X1. In FIG. 4, the radially inner branch 52a of the first annular part 52 and the radially inner branch 54a of the second annular part 54 extend axially over a greater distance, respectively, than the radially outer branch 52b of the first annular part 52 and the radially outer branch 54b of the second annular part 54. The radially inner branches 52a, 54a and outer branches 52b, 54b of each of the first annular part 52 and second annular part 54 provide flexibility to the pivot during operation. However, it was noted that the weight of the pivot 40 was still too great and attempts were made to reduce it.

Figures 5A, 5B, 5C, 5D:
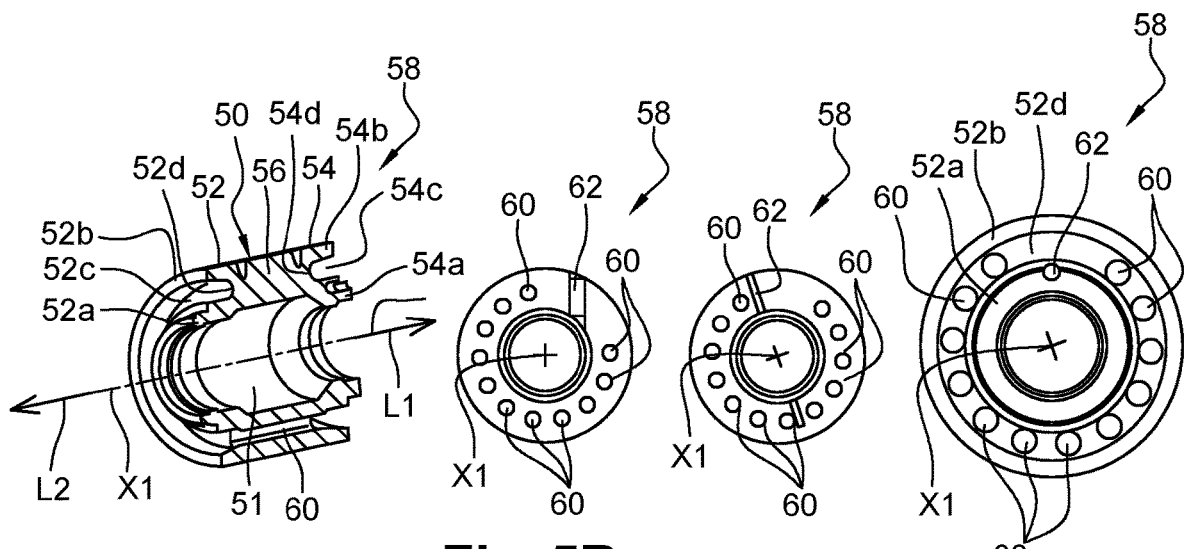
FIGS. 5A, 5B, 5C, 5C and 5D are schematic views of a first embodiment of the invention.

To this end, it is proposed, in a first embodiment of a pivot 58, to make recesses 60 in the material in the intermediate annular part 56 which corresponds to the most massive part of the pivot 58. These recesses 60 are, in the various embodiments, holes made, for example by drilling, through the bottom wall 52d of the first and second grooves 52, 54. Each hole 60 is thus opening at a first end in the first groove 52c and at a second end in the second groove 54c. In this embodiment, the holes 60 are substantially straight and substantially parallel to the axis X1 of the axial passage. As can be seen in FIGS. 5B to 5D, the holes 60 are advantageously regularly distributed over an angular sector of less than 360° to prevent the holes 60 from passing through oil circulation lines 62 used, for example, to lubricate the sliding bearing described above.

Figure 6:
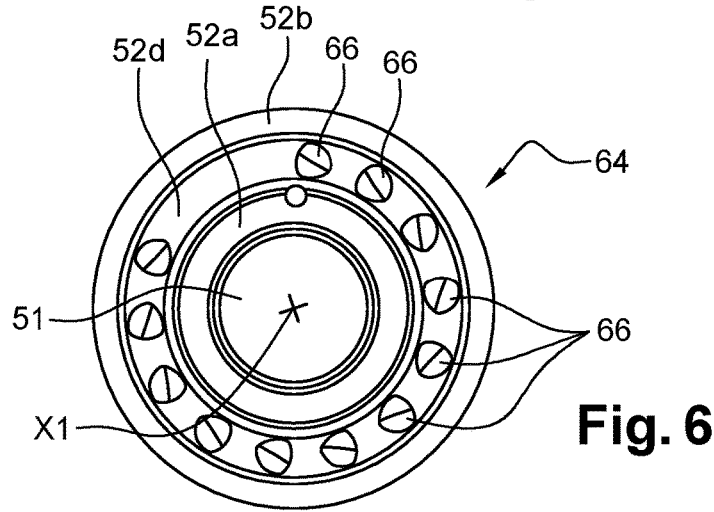
FIG. 6 is a schematic view of a pivot according to a second embodiment of the invention.
Figure 7:
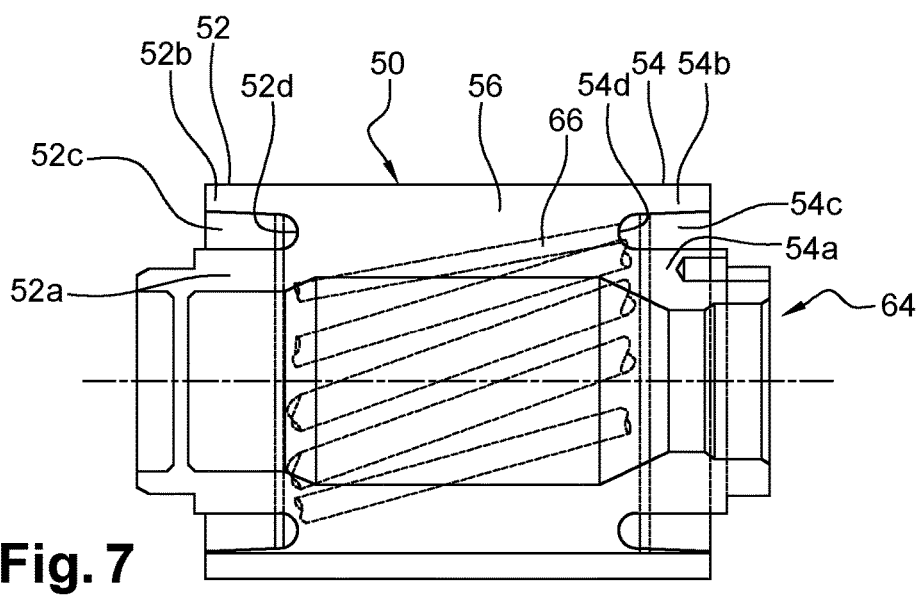
FIG. 7 is a schematic lateral view of the pivot of FIG. 6.

In another embodiment of the invention shown in FIG. 6 and better visible in FIG. 7, the pivot 64 and the holes 66 are inclined with respect to the axis X1 of the axial passage by an angle between 0° and 30°

In other embodiments not shown, the pivot could include material recesses in the form of holes such as blind holes, which are, however, more difficult and expensive to make. First holes could be formed for example in the bottom wall of the first groove and extend axially or be inclined as in the second embodiment shown in FIGS. 6 and 7. Second holes could be formed in the bottom wall of the second groove and extend axially or be inclined as in the second embodiment shown in FIGS. 6 and 7. The first and second holes can also be arranged alternately circumferentially around the pivot axis.

The invention claimed is:

1. A pivot for a sliding bearing of an epicyclic train, comprising an annular wall defining an axial passage and comprising a first and a second annular groove opening axially in opposite directions and each defined by two coaxial inner and outer annular branches formed at the axial ends of the annular wall, characterized in that recesses are formed in at least one bottom wall of one of the annular grooves.

2. A pivot according to claim 1, wherein the recesses are distributed around the axial passage.

3. A pivot according to claim 2, wherein the recesses are regularly distributed around the axial passage.

4. A pivot according to claim 3, wherein the recesses are holes opening at a first end into the first annular groove and at a second opposite end into the second annular groove.

5. A pivot according to claim 2, wherein the recesses are holes opening at a first end into the first annular groove and at a second opposite end into the second annular groove.

6. A pivot according to claim 2, wherein the recesses are substantially straight.

7. A pivot according to claim 6, wherein the recesses are inclined relative to an axis of the axial passage.

8. The pivot according to claim 7, wherein the recesses are inclined relative to the axis of the axial passage by an angle between 0° and 30°.

9. A pivot according to claim 1, wherein the recesses are holes opening at a first end into the first annular groove and at a second opposite end into the second annular groove.

10. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot pin according to claim 1.

11. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot according to claim 2.

12. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot according to claim 3.

13. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot according to claim 9.

14. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot according to claim 5.

15. An epicyclic gear train of an aircraft gas turbine engine, comprising an outer ring gear and planetary pinions meshing with a central pinion and with the outer ring gear and each mounted for free rotation on a planetary carrier, the planetary pinions being able to rotate about a planet axis via one said pivot according to claim 4.

16. A gas turbine engine for aircraft comprising an epicyclic gear train according to claim 10, the central pinion of which surrounds and is rotationally integral with a shaft of a compressor of the turbine engine.

17. A gas turbine engine according to claim 16, wherein the outer ring gear is integral with a casing or static annular shroud of a low-pressure compressor.

\* \* \* \* \*